United States Patent
Westlake et al.

(10) Patent No.: US 9,742,923 B2
(45) Date of Patent: Aug. 22, 2017

(54) SYSTEM AND METHOD FOR SECURE TRANSMISSION OF DATA SIGNALS

(71) Applicant: CARDEASY LIMITED, London (GB)

(72) Inventors: Colin Philip Westlake, London (GB); James Sebastian Campbell, Petworth (GB)

(73) Assignee: CARDEASY LIMITED, London (GB)

( * ) Notice: Subject to any disclaimer, the term of this patent is extended or adjusted under 35 U.S.C. 154(b) by 0 days.

(21) Appl. No.: 14/954,920

(22) Filed: Nov. 30, 2015

(65) Prior Publication Data
US 2016/0165061 A1   Jun. 9, 2016

(30) Foreign Application Priority Data

Dec. 4, 2014   (GB) .................................. 1421597.4

(51) Int. Cl.
*H04M 11/00*     (2006.01)
*H04M 7/00*      (2006.01)
(Continued)

(52) U.S. Cl.
CPC .......... *H04M 7/0078* (2013.01); *G06Q 20/00* (2013.01); *H04L 63/0245* (2013.01);
(Continued)

(58) Field of Classification Search
CPC ............. H04M 7/0078; H04M 3/5166; H04M 7/1295; H04M 2203/6081; H04M 2203/6009; H04M 3/51; H04L 63/123; H04L 63/0245; G06C 20/00
See application file for complete search history.

(56) References Cited

U.S. PATENT DOCUMENTS

| 8,204,180 B1 | 6/2012 | Narayanan et al. |
| 8,275,115 B1 * | 9/2012 | Everingham ....... H04M 3/5166 379/265.01 |
| 8,619,951 B2 * | 12/2013 | Johansen ............ H04M 3/2281 379/93.02 |

(Continued)

FOREIGN PATENT DOCUMENTS

| GB | 2478916 A | 9/2011 |
| WO | WO 2009/136163 A2 | 11/2009 |
| WO | WO 2011/117573 A1 | 9/2011 |

OTHER PUBLICATIONS

SYNTEC, Video for "CardEasy PCI DSS compliant card payment by phone and call recording," 5 Pages [online] [Retrieved on Nov. 30, 2015] Retrieved from the internet <URL:http://www.syntec.co.uk/pci-dss-solutions/cardeasy/>.

(Continued)

*Primary Examiner* — Stella Woo
(74) *Attorney, Agent, or Firm* — Fenwick & West LLP

(57) ABSTRACT

A call processing system comprises first and second interfaces configured to selectively pass voice signals and data signals between caller and agent to enable communication. An attenuation means is configured to selectively attenuate voice and data signals passing from the first interface to the second interface to impede the agent from receiving voice and data signals from the caller. While a string of discrete data signals is received at the first interface, the system is configured to operate exclusively in each of: a first mode in which voice and data signals are permitted to pass from the first interface to the second interface to enable the agent to receive them from the caller; and a second mode in which the attenuation means attenuates voice and data signals passing from the first interface to the second interface to impede the agent from receiving them from the caller.

22 Claims, 6 Drawing Sheets

(51) Int. Cl.
*G06Q 20/00* (2012.01)
*H04L 29/06* (2006.01)
*H04M 3/51* (2006.01)
*H04M 7/12* (2006.01)

(52) U.S. Cl.
CPC ........ *H04L 63/123* (2013.01); *H04M 3/5166* (2013.01); *H04M 3/51* (2013.01); *H04M 7/1295* (2013.01); *H04M 2203/6009* (2013.01); *H04M 2203/6081* (2013.01)

(56) References Cited

U.S. PATENT DOCUMENTS

| | | | |
|---|---|---|---|
| 8,831,204 B1 * | 9/2014 | Pycko | H04M 3/5166 379/265.02 |
| 9,100,484 B1 * | 8/2015 | Kleck | H04M 3/5183 |
| 2011/0228919 A1 * | 9/2011 | Tew | H04M 3/38 379/93.12 |
| 2012/0140911 A1 | 6/2012 | Johansen et al. | |

OTHER PUBLICATIONS

Search Report for United Kingdom Patent Application No. GB 1421597.4, Dec. 20, 2014, 2 Pages.
Schulzrinne, H., et al., "RTP Payload for DTMF Digits, Telephony Tones and Telephony Signals," Network Working Group, May 2000, 29 Pages, can be retrieved at URL: <https://www.ietf.org/rfc/rfc2833.txt>.
European Search Report for European Patent Application No. EP 15198111, May 3, 2016, 8 Pages.

* cited by examiner

First mode

Second mode

Alternative Second mode

SYSTEM AND METHOD FOR SECURE TRANSMISSION OF DATA SIGNALS

CROSS REFERENCE TO RELATED APPLICATIONS

This application claims priority to United Kingdom Patent Application No.: GB 1421597.4, entitled "System And Method For Secure Transmission Of Data Signals," filed on Dec. 4, 2014, which is incorporated herein by reference in its entirety.

BACKGROUND

1. Field

The disclosure relates generally to a telephone call processing system and a method of processing telephone calls, and in particular to systems and methods that facilitate secure transmission of sensitive information during a call between a caller and an agent such that the agent cannot receive the sensitive information.

2. Background

Call centres are typically large facilities of telephone operators or 'agents'. These centres are provided by organizations that want to interact with existing or prospective clients and customers. A call centre agent normally interacts with a client or customer by taking or making telephone calls. It is common practice for the call centres to record client conversations, and for information taken during the call to be entered into and stored in the agent's computer.

One use of call centres is to provide services to the public that allow payment for goods and services via telephone calls. Each year, millions of people make purchases through agents in telephone call centres, often including high value transactions. For example, family holidays and financial products are often purchased over the telephone. In these transactions, the caller is required by the agent to provide certain pieces of sensitive information in order to confirm his or her identity and/or to complete the purchase. In particular, the sensitive information can include one or more answers to security questions, a password, a date of birth, one or more bank account numbers, and debit or credit card details including the primary account number (PAN), start date, expiry date, and the card security code (e.g. CV2).

It is an unfortunate fact of life that wherever people have access to sensitive information, it will be misused. Data and card fraud perpetrated by call centre agents, as well as fraudulent financial transactions are well-documented problems that need to be addressed. By divulging identity and/or financial information to an agent for processing a transaction through a call centre, a caller puts themselves at risk of having that information stolen by the agent and used for nefarious purposes. Other threats exist from hackers gaining access to an agent's computer or a call centre network, or eavesdroppers intercepting a call to an agent. Thus, data stored in call recordings, or sent by a caller to an agent may also be at risk from theft by third parties. In order for the industry to flourish, it is essential that clients and customers calling a call centre are able to trust that their sensitive information is not at risk.

To address card fraud, the payment card industry established a number of data security standards. One example is the Payment Card Industry (PCI) Data Security Standard (DSS) which provides periodically updated guidelines for the processing and storage of credit card data. In particular, the PCI-DSS specifies the ways in which companies that handle credit card data (including telephone-based credit card transactions) are permitted to store information. All merchants, globally, are expected to comply with the PCI-DSS, and so these regulations have a direct impact on call centres that receive sensitive information during telephone calls.

Several known systems exist to allow call centre agents to take debit or credit card payments over the phone without the caller having to read out sensitive card details (e.g. primary account number (PAN), start date, expiry date, the card security code (e.g. CV2)) to the agent directly. These systems typically require the caller to enter the card details using a 'touch-tone' keypad, which encodes the details using dual-tone multi-frequency (DTMF) signalling. DTMF has been established for decades and, as would be familiar to a skilled person, can be used to communicate alphanumeric characters through a telephone audio channel during a phone call. The DTMF tones used to encode the caller's card details can then be decoded by a call processor and transmitted to a payment processing system.

DTMF offers a basic level of security that represents a significant improvement over a caller speaking his or her card details to the agent. However, it is a long way from assuring customers that their sensitive information is not at risk. DTMF is easily decoded by conventional and readily available systems. Accordingly, a determined agent or third party would even be able to steal card details transmitted by DTMF, simply by obtaining or copying the signal that is recorded and stored by the call centre and then by employing a DTMF decoder offline to reveal the digits. Thus, the use of DTMF alone was quickly found to be insufficient for establishing a robust data security system.

There is an exemplary DTMF system of the kind described above that is particularly convenient to implement, and also provides improved security for the user. It just so happens that the equipment used to process phone signals with DTMF tones is routinely required when converting a phone signal from Time Division Multiplex (TDM) to Voice over IP (VoIP). TDM signals are conventional for telephony, but VoIP systems are often preferred because of their ability to implement high compression codecs to reduce the bandwidth requirement (and thereby to reduce network costs). However, because the VoIP codecs are designed to optimise voice compression, they do not satisfactorily encode DTMF tones. This leads to erroneous decoding of the DTMF tones from VoIP signals.

The Internet Engineering Task Force (IETF) document RFC-2833 describes a solution to the above-mentioned problem. This solution is known as 'DTMF clamping', and works by removing the in-band DTMF tones from the original signal and replacing them with an out-of-band data signal. By the early 2000s many manufacturers of VoIP gateways had commercialised a DTMF clamping function as a standard feature.

In recent years, owing to the prevalence of VoIP gateways with DTMF clamping, a technician devising a PCI-DSS compliant system for call centre is provided with a straightforward solution: all that is required to prevent card details entered by a caller using a touch-tone keypad from reaching the agent is to situate a VoIP gateway with DTMF clamping upstream of the agent. The card details would be provided by the VoIP gateway as an out-of-band data signal, which could be transmitted to a payment processing system. FIG. 1 shows a representation of such a system, in which a call from a caller 100 is processed in a call processor 102 having a VoIP gateway capable of DTMF clamping. The in-band DTMF tones representing the card details are replaced with an out-of-band data signal which is sent to a third party 104 (e.g., a bank). The voice signals are converted to VoIP and sent to the agent 106.

However, there is a significant problem with DTMF clamping. While clamping may mitigate theft of sensitive information transmitted using the tones, it also prevents them from being used for any other purpose. In particular, it is commonplace for call centres to use interactive voice response (IVR) systems, for example to enable a user to navigate through one or more menus using a 'touch-tone' keypad. DTMF clamping can prevents this functionality because the IVR system would be prevented from receiving the DTMF tones.

WO 2011/117573 discloses a solution that prevents theft of DTMF from recorded and stored signals while enabling use of an IVR system. A simplified representation of the solution is shown in FIG. 2. The illustrated call processor 202 operates by splitting the incoming signal from the caller 200 into first and second versions 204*a*, 204*b*. One of the versions 204*a* of the incoming signal is directed to a call recorder 206 and is to be recorded and stored by the call centre. All DTMF tones are removed from this version 204*a* of the signal using conventional sensing and filtering techniques. Thus, the recorded and stored signal in the call recorder 206 lacks any tones representing sensitive information, which cannot thus be stolen. The other version 204*b* of the signal is sent to the agent 212 for processing as usual, and may be routed through an IVR 210.

Although mitigating the risk of theft of sensitive information from recorded and stored signals, the solution disclosed in WO 2011/117573 still permits the agent to hear the DTMF tones. Thus, a particularly determined agent or third party may make his or her own recording of the DTMF tones for decoding offline. This has become more prevalent with the near ubiquity of digital recording devices such as smart phones, which would facilitate such a crime.

WO 2009/136163 proposes a refinement to the DTMF clamping technique. Faced with a situation in which DTMF tones must be transmitted some of the time (e.g. for IVR) but must not at others (i.e. to prevent theft by an agent), the refinement proposed by WO 2009/136163 is effectively to turn the DTMF clamping functionality on and off as necessary. Specifically, this document describes a telephone call processor with the capability to be switched between two modes: "normal" and "safe". In 'safe mode' any DTMF tones are removed from the original signal while the voice component is allowed to pass to the agent (to allow conversation between the caller and agent to be maintained at all times). 'Safe mode' is used when the caller is transmitting sensitive information. In 'normal mode' both the voice component and the DTMF tones are allowed to pass to the agent/IVR system.

However, all of the solutions devised thus far remain flawed and exhibit a latent security risk which appears not to have been appreciated. The present inventors have observed that when some callers (particularly the elderly) are entering sensitive information using a touch-tone keypad, they have a tendency to vocalise the digits as they press the associated key. Because voice signals are allowed to pass through a DTMF clamping system as well as the systems described in WO 2009/136163 and WO 2011/117573, there remains a risk that the agent or third party will hear the sensitive information and it will be recorded by a call recorder.

A second security risk remains in state of the art systems owing to a deficiency in DTMF clamping and other DTMF blocking or masking systems. Such systems must first detect that a DTMF tone is present before they can remove it from the signal. Inevitably there is a delay between the beginning of the tone and the point at which it is removed due to the complexity of the recognition routines. Accordingly, even where systems are provided for removing DTMF from a signal, a detectable amount is likely to pass through.

In view of the above there remains a need to provide an improved system and method for secure transmission of data signals.

SUMMARY

Accordingly, in a first aspect, the present disclosure provides a telephone call processing system for processing telephone calls comprising voice signals and data signals between a caller and an agent, the system comprising:
a first interface for receiving voice signals and data signals from the caller and a second interface for receiving voice signals and data signals from the agent, the first and second interfaces configured to selectively pass voice signals and data signals therebetween to enable communication between the caller and agent;
attenuation means configured to selectively attenuate voice and data signals passing from the first interface to the second interface to impede the agent from receiving voice and data signals from the caller;
detection means configured to detect and decode data signals received at the first interface; and
a processor coupled to the attenuation means and detection means and configured to cause the detection means to begin detecting and decoding a string of discrete data signals from the caller, the string of discrete data signals having a length and conveying sensitive information;
wherein while the string of discrete data signals is being received at the first interface, the telephone call processing system is configured to operate exclusively in each of:
a first mode in which voice signals and data signals are permitted to pass from the first interface to the second interface to enable the agent to receive voice and data signals from the caller; and
a second mode in which the processor causes the attenuation means to attenuate voice and data signals passing from the first interface to the second interface to impede the agent from receiving voice and data signals from the caller.

By operating in a second mode in which both voice and data signals passing from the first interface to the second interface are attenuated to impede the agent from receiving both voice and data signals from the caller, it is impossible for sensitive information to be stolen by the agent or from the agent's computer or the call centre network. By 'impeded' it is meant that the signals are attenuated to such an extent that the agent cannot discern the entirety of the information content of the signals (both voice and data). Even if the caller chose to read out the digits while entering them using DTMF, the agent would be prevented from receiving the sensitive information.

Preferably, the processor is adapted to cause the telephone call processing system:
a) to operate in the first mode for a first period;
b) immediately thereafter to switch from the first mode to the second mode and operate in the second mode for a second period; and
c) immediately thereafter to revert from the second mode to the first mode.

Thus, a caller and an agent are able to converse as the caller begins to enter the sensitive information, and as the caller approaches the end of the entry, but for a period during the middle of the entry, the system operates in the second mode such that the agent is impeded from receiving voice and data signals from the caller.

Preferably, the processor is configured to switch from the first mode to the second mode upon detection, by the detection means, of a first pre-determined number of discrete data signals of the string of discrete data signals. Thus, the system may be configured to ensure a certain period for operating in the first mode and to ensure switching to the second mode at an appropriate time. Moreover, the switch to the second mode may take place at a particular point to ensure a certain subset of the string of discrete data signals is not received by the agent. For instance, if digits 7 to 12 are more sensitive than digits 1 to 6, the system make be configured to switch from the first mode to the second mode on or before receipt of the first six digits.

Moreover, the processor may be configured to revert from the second mode to the first mode upon detection, by the detection means, of a second pre-determined number of discrete data signals of the string of discrete data signals. Thus, the system may be configured to ensure a certain period for operating in the second mode and to ensure switching back to the first mode at an appropriate time. Moreover, the switch back to the first mode may take place at a particular point to ensure a certain subset of the string of discrete data signals is not received by the agent. For instance, if digits thirteen onwards are less sensitive than digits seven to twelve, the system may be configured to switch from the second mode back to the first mode on or after receipt of the first twelve digits.

In certain embodiments, information represented by a subset of the string of discrete data signals may be indicative of its length, in which case the processor may be configured to determine that length once the subset has been detected and decoded by the detection means. It is particularly helpful to know the length of the string of data signals to determine an appropriate number of data signals to receive while operating in each of the first and second modes. For instance, to ensure adequate security, it may be appropriate to operate in the second mode for 50% of the data signals in the string of data signals. In that case, it would be necessary for the system to determine the length of the string. Preferably the subset is at the beginning of the string.

Preferably, the processor is configured to revert from the second mode to the first mode upon detection, by the detection means, of a number of discrete data signals of the string of discrete data signals equal to the determined length minus a third pre-determined number. It may be appropriate to operate in the first mode during receipt of a certain number of discrete data signals at the end of the string. For instance, it may be appropriate to operate in the first mode during receipt of the final four discrete data signals of the string. Thus, the system may be configured to switch from the second mode back to the first mode after receipt of four fewer than the total number of digits.

The attenuation means may be configured to selectively block voice and data signals passing from the first interface to the second interface to prevent the agent from receiving voice and data signals from the caller. Blocking the signals rather than merely attenuating them removes all risk of the information content of the signals being received by the agent or a third party.

Optionally, the attenuation means is further configured to attenuate voice and data signals passing from the second interface to the first interface to impede the caller from receiving voice and data signals from the agent, in which case, in the second mode, the processor may cause the attenuation means to attenuate voice and data signals passing from the second interface to the first interface. This may be helpful to remind caller and agent that the caller cannot have a two-way conversation with the agent. Rather than allow one-way communication from the agent to the caller, the system may be configured to prevent all communication between caller and agent.

Again, the attenuation means may be configured to selectively block voice and data signals passing from the second interface to the first interface to prevent the caller from receiving voice and data signals from the agent. As mentioned above, blocking the signals rather than merely attenuating them removes all risk of the information content of the signals being received by the caller from the agent.

Optionally, the processor may be configured to cause the detection means to begin detecting and decoding the string of discrete data signals, either:

a) automatically, upon receipt of the first data signal in the string of data signals; or b) upon receipt of an instruction, preferably an instruction received from the agent via an internet connection.

Until the caller begins to enter the string of data signals, the detection means need not begin detecting and decoding. However, this must start as soon as the caller begins to enter the string so as to avoid losing any data. In other words, the detection means must begin detecting and decoding when (or before) the caller begins to enter the string of data signals. This could be achieved automatically by the system identifying the first data signal in the string and automatically commencing detection and decoding at that time. That would be most convenient. However, since data signals are often used for non-sensitive communication, it is difficult for the system to discern whether a sensitive string is being entered or not. Accordingly, the agent may send the system an instruction to begin detecting and decoding when (or before) prompting the caller to enter the sensitive information.

Preferably, the string of discrete data signals is a plurality of dual-tone multi-frequency (DTMF) audio tones and the detection means is configured to determine an alphanumeric digit associated with each DTMF audio tone.

Preferably the alphanumeric digits associated with the plurality of DTMF audio tones of the string of discrete data signals represent a whole or part of a Primary Account Number (PAN) or card security code (e.g. CV2) of a bank card.

In certain embodiments, the processor may be configured to communicate the information from the detected and decoded string of discrete data signals to a third party for subsequent processing. For instance, the third party may be a payment processing company.

In a second aspect, the present disclosure provides a method of processing telephone calls comprising voice signals and data signals between a caller and an agent, the method comprising:

receiving, at a call processor, voice signals and data signals from the caller, the data signals including a string of discrete data signals having a length and conveying sensitive information;

detecting and decoding the string of data signals received from the caller; and while receiving the string of discrete data signals, operating the call processor exclusively in each of:

a first mode in which the voice signals and data signals received from the caller are passed to the agent; and a second mode in which the voice signals and data signals received from the caller are attenuated to impede the agent from receiving them.

Preferably, the step of operating the call processor comprises:

a) operating the call processor in the first mode for a first period;

b) immediately thereafter switching the call processor from the first mode to the second mode and operating the call processor in the second mode for a second period; and c) immediately thereafter to reverting the call processor from the second mode to the first mode.

Preferably, the step of switching the call processor from the first mode to the second mode is triggered upon detection of a first pre-determined number of discrete data signals of the string of discrete data signals.

Moreover, the step of reverting the call processor from the second mode to the first mode may be triggered upon detection of a second pre-determined number of discrete data signals of the string of discrete data signals.

In certain embodiments, the step of detecting and decoding the string of data signals comprises detecting and decoding a subset of the string, in which case the method may further comprise determining the length of the string based upon information represented by the subset.

Preferably, the step of reverting the call processor from the second mode to the first mode is triggered upon detection of a number of discrete data signals of the string equal to the determined length of the string minus a third pre-determined number.

The step of attenuating the voice signals and data signals received from the caller may comprise blocking the voice and data signals to prevent the agent from receiving them.

Optionally, the step of operating the call processor in the second mode further comprises attenuating voice signals and data signals received from the agent to impede the caller from receiving them.

Again, the step of attenuating the voice signals and data signals received from the agent may comprise blocking the voice and data signals to prevent the caller from receiving them.

Optionally, the step of detecting and decoding the string of data signals received from the caller is triggered either:

a) automatically, upon receipt of the first data signal in the string of data signals; or b) upon receipt of an instruction, preferably an instruction received from the agent via an internet connection.

Preferably, the string of discrete data signals is a plurality of dual-tone multi-frequency (DTMF) audio tones, in which case the method further comprises determining an alphanumeric digit associated with each DTMF audio tone.

Preferably, the alphanumeric digits associated with the plurality of DTMF audio tones of the string of discrete data signals represent a whole or part of a Primary Account Number (PAN) or card security code (e.g. CV2) of a bank card.

In certain embodiments, the method further comprises the step of communicating the information from the detected and decoded string of discrete data signals to a third party for subsequent processing.

BRIEF DESCRIPTION OF THE DRAWINGS

Preferred embodiments will now be described in detail with reference to the accompanying drawings, in which.

DETAILED DESCRIPTION

Figure 1:
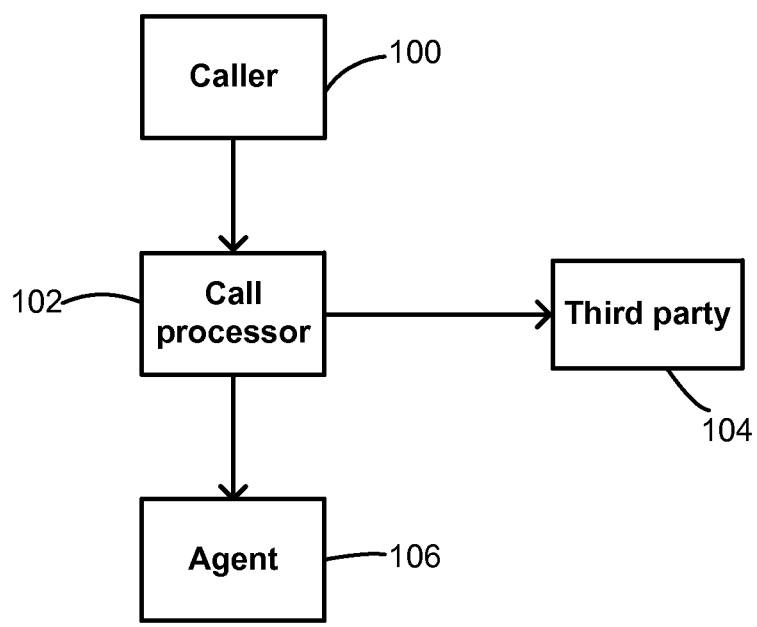
FIG. 1 illustrates a representation of a first exemplary call processing system of the prior art.
Figure 2:
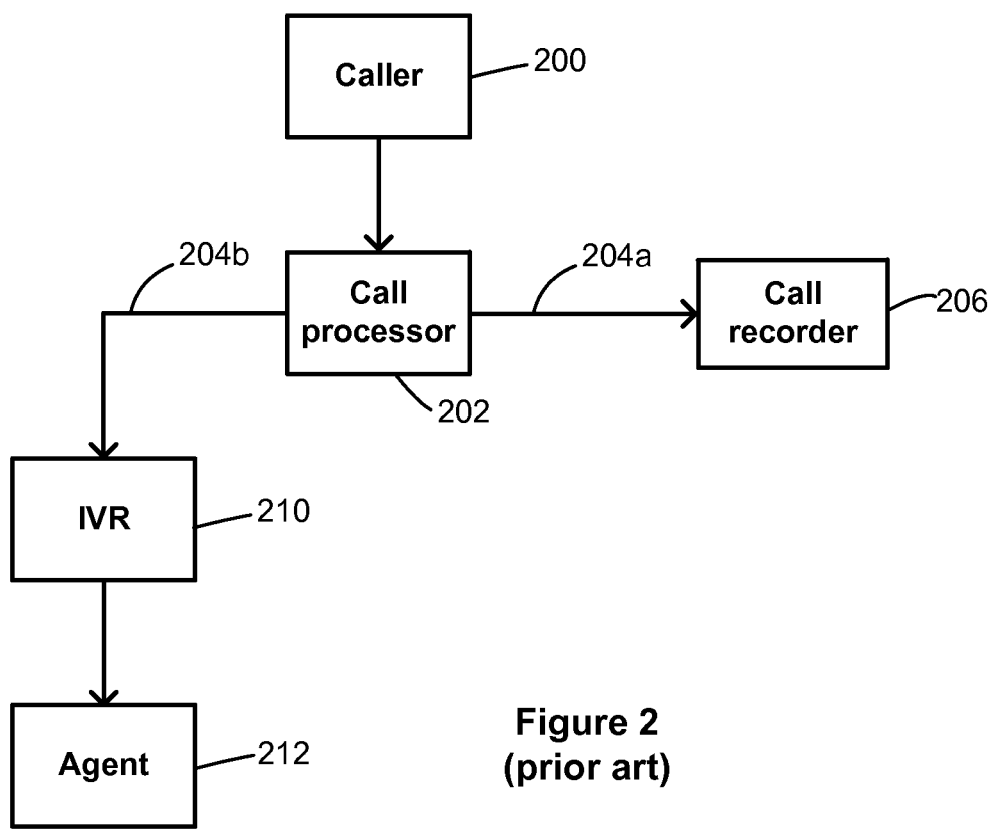
FIG. 2 illustrates a representation of a second exemplary call processing system of the prior art.
Figure 3:
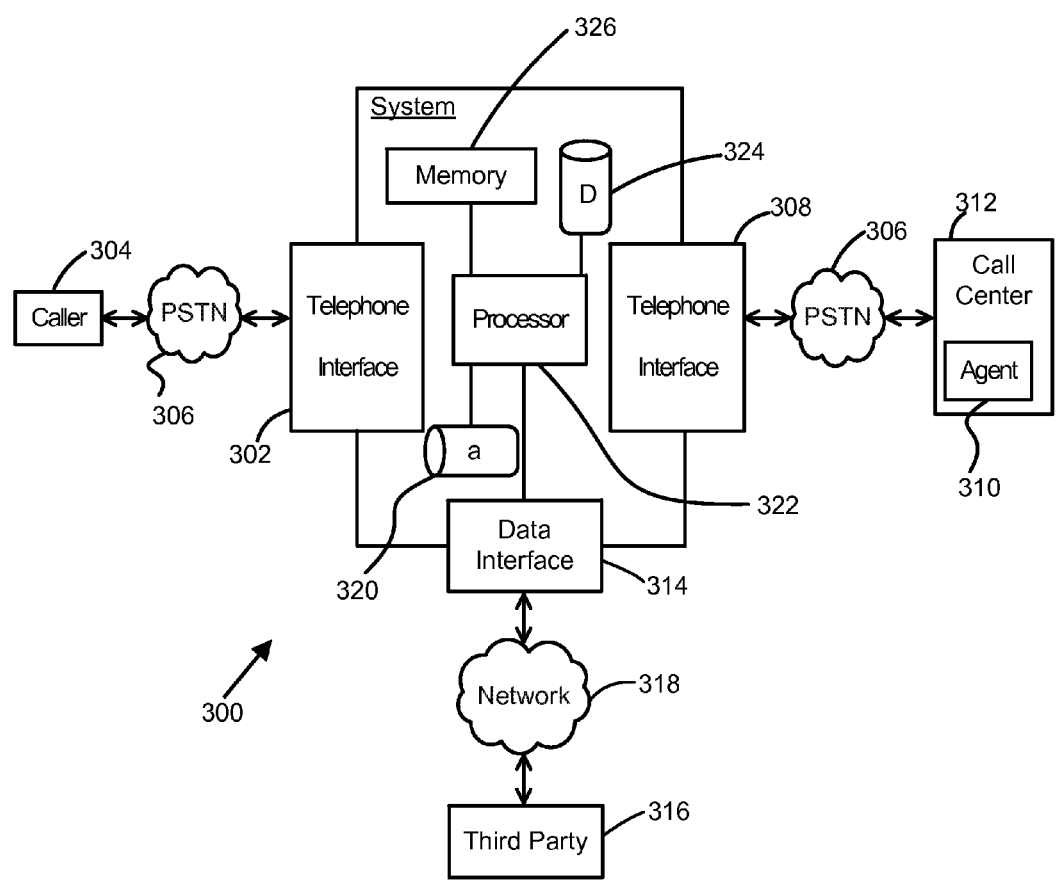
FIG. 3 illustrates a call processing system, according to one embodiment of the present disclosure.

FIG. 3 shows a telephone call processing system 300, according to a first embodiment of the present disclosure.

The system 300 comprises a first telephone interface 302 configured to receive telephone signals from a caller 304 across a public switched telephone network (PSTN) 306. The first telephone interface 302 is further configured to send telephone signals to the caller 304 across the PSTN 306.

The system comprises a second telephone interface 308 configured to send telephone signals to an agent 310. The agent 310 is one of a plurality of agents operating in a call centre 312. The second telephone interface 308 may be configured to communicate with the agent 310 across a direct line, or via a private branch exchange (PBX). The second telephone interface 308 is configured to send telephone signals to the agent 310 across the PSTN 306 such that it is remote from the call centre 312 and can therefore be managed by a third party, for example. However, this need not be the case, and the second telephone interface 308 could instead be part of a private network (not shown) within the call centre 312 and configured to send telephone signals to the agent 310 across the private network. The second telephone interface 308 is further configured to receive telephone signals from the agent 310 across the same communication channels mentioned above.

The first and second telephone interfaces 302 and 308 are configured to pass telephone signals between. In other words, telephone signals from the caller 304 received at the first telephone interface 302 may be passed to the second telephone interface 308 and then to the agent 310. Likewise, telephone signals from the agent 310 received at the second telephone interface 308 may be passed to the first telephone interface 302 and then to the caller 304.

The system 300 further comprises a data interface 314 configured to send data signals to a third party 316 across a data network 318 and if necessary to receive data signals from the third party 316 across the network 318. The third party 316 may be a payment processing service; a bank; a building society; a retailer, etc.

The system 300 further comprises a means 320 for attenuating the telephone signals passed between the first and second telephone interfaces 302 and 308 (e.g. from the first telephone interface 302 to the second telephone interface 308, and optionally from the second telephone interface 308 to the first telephone interface 302). The means may be implemented in software or hardware in any one of a number of conventional ways with which a skilled person would be familiar. The purpose of the means 320 for attenuating is to impede the agent 310 (and/or caller 304) from receiving telephone signals from the caller 304 (or agent 310, respectively). In this connection, by 'telephone signals' it is meant all signals (both voice signals and data signals, of both in-band frequencies and out-of-band frequencies). Preferably, the means 320 for attenuating completely blocks the signals, such that the agent 310 and/or caller 304 is completely prevented from receiving them. Alternatively, the signals are so attenuated that the agent 310 and/or caller 304 cannot practically detect them even if traces of them exist. Alternatively, the signals are so modified (for instance by superposition) that their information content does not reach its destination.

The system 300 further comprises a means 324 for detecting and decoding data signals received at the first telephone interface 302. In the embodiments described herein, the data signals take the form of a plurality of discrete DTMF tones that may be generated by a touch-tone keypad, for example. A plurality of consecutive tones form a string, an example of which may be a whole or part of a primary account number of a credit or debit card. Means for detecting and decoding DTMF tones are well established and a skilled person would be capable of implementing such means in software or hardware.

In order to operate the system, a processor 322 and memory 326 are provided, each suitably configured to enable the system to carry out the functions described herein, as would be appreciated by a skilled person.

Operation of the system 300 will now be described with reference to FIGS. 4A to 4C.

The present disclosure finds particular utility in situations in which a caller discusses a purchase with an agent prior to entering his or her credit or debit card details. Callers enjoy personable human interaction when making a purchase; this provides an opportunity to ask questions about the product or service being purchased and callers are left reassured that the entity from which they are making a purchase is bona fide. For at least these reasons, purchases from a human agent are still preferred over fully automated purchasing systems.

While the caller and agent are discussing the purchase, two-way communication is required. That is, all telephone signals received from the caller 304 at the first telephone interface 302 must be passed to the second telephone interface 308 and then to the agent 310, and all telephone signals received from the agent 310 at the second telephone interface 308 must be passed to the first telephone interface 308 and then to the caller 304. It goes without saying that two-way communication of voice signals is necessary; but it is also particularly advantageous for data signals generated by the caller to be able to pass from the first telephone interface 302 to the second telephone interface 308 to enable the caller 304 to interact with an IVR in the call centre (not shown), for instance. Transmission of data signals generated by the agent 310 may optionally be passed from the second telephone interface 308 to the first telephone interface 302, if desired.

During a call between a caller and an agent to make a purchase, there will come a time when the caller is prompted (for example, by the agent) to begin entering their credit or debit card details using their touch-tone keypad. Occasionally, while entering their credit or debit card details, callers will encounter difficulties, make a mistake, or generally require guidance or encouragement from the agent. For this reason, it is desirable for two-way communication between the caller and the agent to be maintained.

However, if two-way communication is maintained throughout the period the caller is entering their credit or debit card details, the agent (and any recording equipment utilised by the call centre) will receive the encoded card details, exposing the caller to a risk of theft of their card details.

Accordingly, and referring to FIGS. 4A to 4C, a preferred embodiment of a system and method according to the present disclosure operates as follows.

During (or optionally throughout) the period of time in which the caller 304 is entering their credit or debit card details, the system 300 operates exclusively in each of a first mode and a second mode. By 'exclusively' it is meant that the system 300 does not operate in any mode other than the first mode or the second mode, and also does not operate in those modes simultaneously.

Figure 4A:
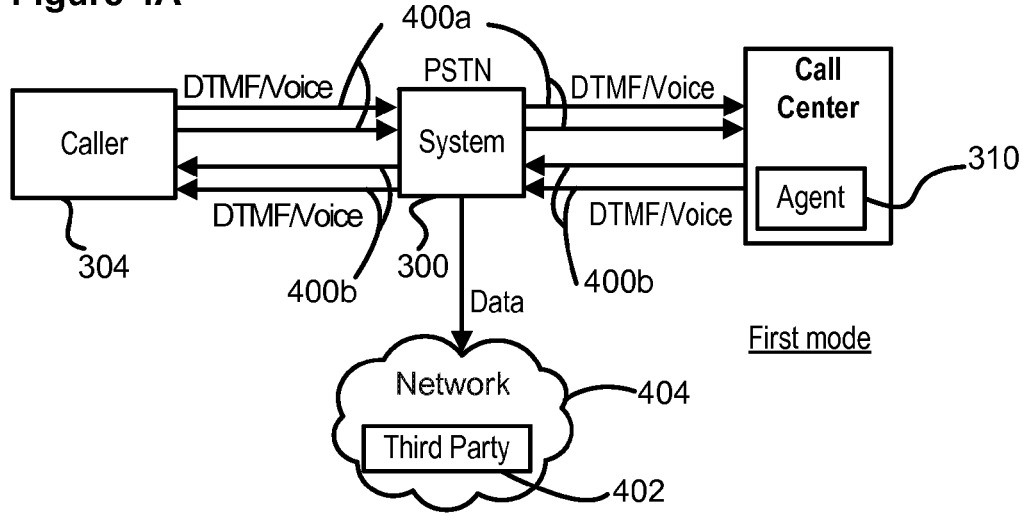
FIG. 4a illustrates a signal flow for the system of FIG. 3 operating in a first mode.

In the first mode illustrated in FIG. 4A, voice and data signals 400*a* sent by the caller 304 to the first telephone interface 302 are passed to the second telephone interface 308 and then to the agent 310. In the illustrated embodiment, voice and data signals 400*b* sent by the agent 310 to the second telephone interface 308 are passed to the first telephone interface 302 and then to the caller 304. This is desirable to maintain two-way communication. In other words, while the system 300 is operating in the first mode, the caller 304 and the agent 310 may continue to communicate as usual so that the agent 310 can provide the caller 304 with guidance.

The data signals (e.g. DTMF tones) received at the first telephone interface 302 while the system 300 is operating in the first mode are detected and decoded by the means for detecting and decoding 324, and the decoded information is temporarily stored in memory 326.

At some point, the system 300 switches to operate in the second mode. Switching from the first mode to the second mode will be explained in more detail below.

Figure 4B:
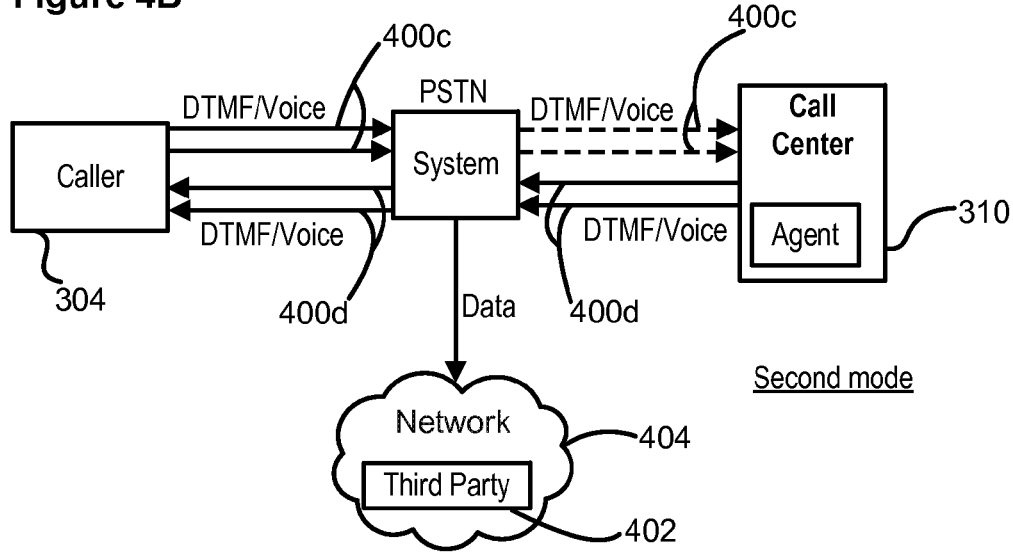
FIG. 4b illustrates a signal flow for the system of FIG. 3 operating in a second mode.

In the second mode illustrated in FIG. 4B, voice and data signals 400*c* sent by the caller to the first telephone interface 302 are attenuated by the means for attenuating 320, resulting in attenuated voice and data signals 400*c'* being passed to the second telephone interface 308 and then to the agent 310. The voice and data signals 400*c'* are attenuated to such an extent that the agent 310 cannot detect them. In alternative embodiments, the means for attenuating 320 blocks the signal from passing to the second telephone interface 308 such that the agent 310 does not receive them.

In the illustrated embodiment of FIG. 4B, voice and data signals 400*d* sent by the agent 310 to the second telephone interface 308 are passed to the first telephone interface 302 and then to the caller 304. This enables the agent 310 to provide the caller 304 with guidance even while the signals from the caller 304 are not being passed to the agent 310. For instance, if the system 300 has been operating in the second mode for a significant length of time, the agent 310 may deduce a problem, and provide the caller 304 with guidance.

As is the case in the first mode, the data signals (e.g. DTMF tones) received at the first telephone interface 302 while the system 300 is operating in the second mode are detected and decoded by the means for detecting and decoding 324, and the decoded information is temporarily stored in memory 326.

Figure 4C:
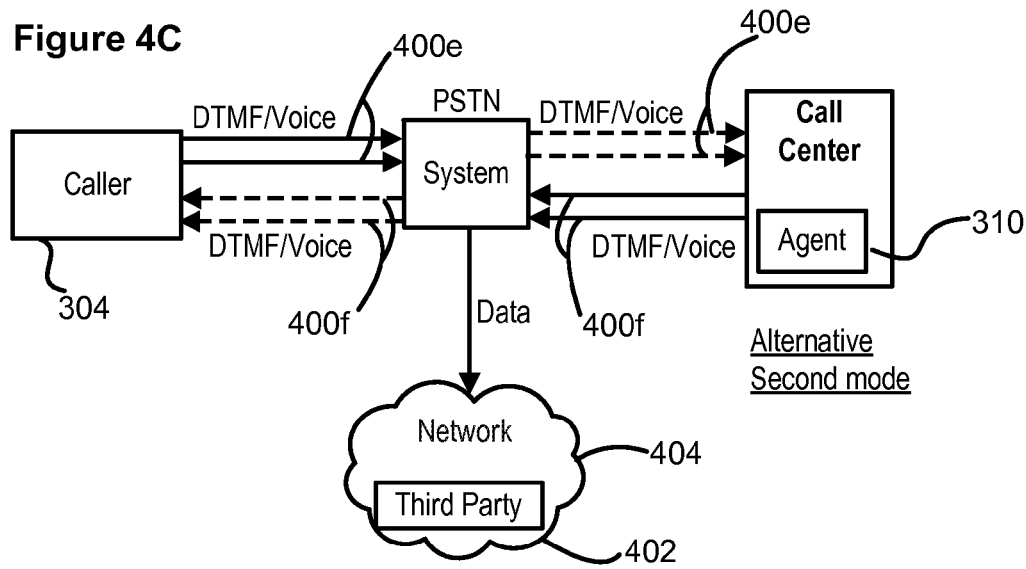
FIG. 4c illustrates a signal flow for the system of FIG. 3 operating in an alternate second mode.

FIG. 4C illustrates an alternative second mode. Here, voice and data signals 400*e* sent by the caller 304 to the first telephone interface 302 are attenuated by the means for attenuating 320 as with the embodiment illustrated in FIG. 4B. However, unlike with the embodiment of FIG. 4B, in the embodiment of FIG. 4C, voice and data signals 400*f* sent by the agent 310 to the second telephone interface 308 are attenuated by the means for attenuating 320, resulting in attenuated voice and data signals 400f' being passed to the first telephone interface 302 and then to the caller 304. Again, the voice and data signals 400f' are attenuated to such an extent that the caller 304 cannot detect them. In alternative embodiments, the means for attenuating 320 blocks the signal from passing to the first telephone interface 302 such that the caller 304 does not receive them.

As is the case in the first mode, the data signals (e.g. DTMF tones) received at the first telephone interface 302 while the system 300 is operating in the alternative second mode are detected and decoded by the means for detecting and decoding 324, and the decoded information is temporarily stored in memory 326.

The decoded information temporarily stored in memory 326 is transmitted by the system 300 across a network 404 to a third party 402 such as a payment processing system. Transmission may be in real-time (that is, concurrently upon receipt of each data signal) or the information may be stored and then transmitted once all of it has been received.

The pattern of operating in the first mode and operating in the second mode during (or optionally throughout) the period of time in which the caller 304 is entering their credit or debit card details may be altered to suit particular circumstances. For instance, the system 300 may begin operating in the first mode and switch to operating in the second mode. Optionally, the system 300 may revert to operating in the first mode. Any pattern is possible. In practice, the system 300 may be configured to switch between the first and second modes as often as required to facilitate conversation between the caller 304 and agent 310 and to ensure adequate security of the caller's information. It will be appreciated that there is a balance to strike here. The longer the system operates in the first mode, the better the prospects for two-way conversation but the greater the risk of giving the agent 310 access to secure information. The longer the system operates in the second mode, the better the security but the worse the prospects for two-way conversation.

Figure 5:
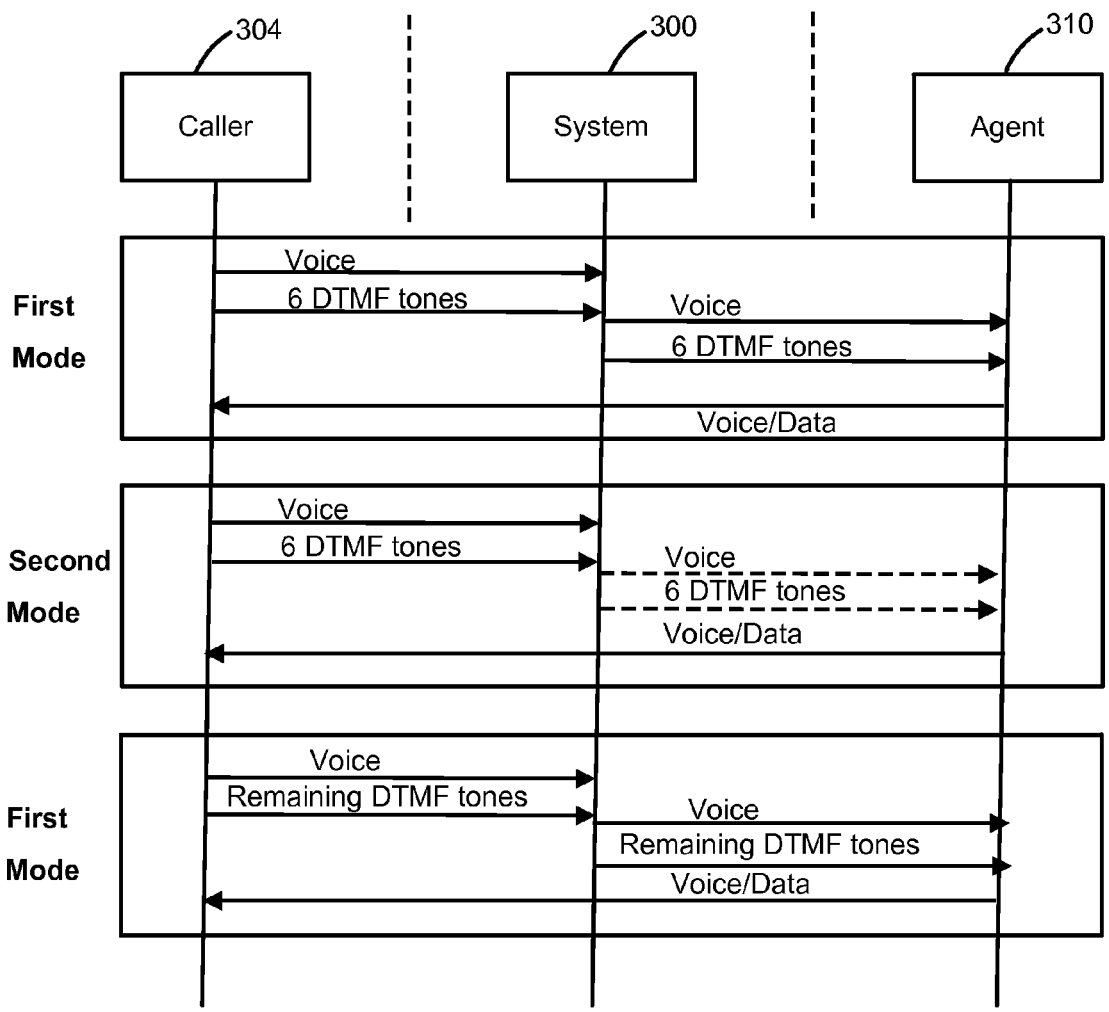
FIG. 5 illustrates an exemplary operating sequence for the system of FIG. 3 operating in an alternate second mode.

FIG. 5 illustrates an exemplary operating sequence of a system according to the present disclosure. In particular, the diagram shows the flow of signals between caller 304, system 300 and agent 310 during (or optionally throughout) the period of time in which the caller 304 is entering their credit or debit card details by generating DTMF tones using a touch-tone keypad.

The diagram shows that the system 300 is configured to operate in the first mode, before switching to operate in the second mode, before reverting to operate in the first mode. In the illustrated embodiment, the system 300 is configured to operate in the first mode (that is, to pass both voice and data signals from the first telephone interface 302 to the second telephone interface 308 and thence to the agent 310) until the means 324 for detecting and decoding the data signals has detected (and optionally decoded) six DTMF tones that represent, for example, the first six digits (i.e. digits 1 to 6) of the caller's PAN.

Once the system has received six DTMF tones, it switches to operate in the second mode (that is, to attenuate (preferably block) voice and data signals passing from the first telephone interface 302 to the second telephone interface 308 to impede (preferably prevent) the agent 310 from receiving them) until the means 324 for detecting and decoding the data signals has detected (and optionally decoded) a further six DTMF tones that represent, for example, the middle six digits (i.e. digits 7 to 12) of the caller's PAN.

Once the system 300 has received the further six DTMF tones (i.e. twelve DTMF tones in total), it reverts to operate in the first mode again until all remaining tones have been received.

Card details vary in their particulars depending on the issuing network. The PAN varies in two important respects. Firstly, the first few numbers varies depending on the issuer identification number (IIN). For example, the PANs on cards issued by AMERICAN EXPRESS begin 34 or 37, whereas the PANs on cards issued by MAESTRO are either between 500000 and 509999 or 560000 and 699999. Secondly, the length of the PAN varies depending on the issuer. For example, PANs on cards issued by DINERS CLUB INTERNATIONAL have length 14; whereas PANs on cards issued by MASTERCARD have length 16; and PANs on cards issued by SWITCH have length 16, 18 or 19. The table below gives the IIN ranges and the PAN length for the most common issuing networks.

| Issuing network | Issuer identification number (IIN) ranges | PAN length |
| --- | --- | --- |
| AMERICAN EXPRESS | 34, 37 | 15 |
| DINERS CLUB INTERNATIONAL | 300-305, 309, 36, 38-39 | 14 |
| DISCOVER CARD | 6011, 622126-622925, 644-649, 65 | 16 |
| JCB | 3528-3589 | 16 |
| MAESTRO | 500000-509999, 560000-699999 | 12-19 |
| DANKORT | 5019 | 16 |
| MASTERCARD | 51-55 | 16 |
| SOLO | 6334, 6767 | 16, 18, 19 |
| SWITCH | 4903, 4905, 4911, 4936, 564182, 633110, 6333, 6759 | 16, 18, 19 |
| VISA | 4 | 13, 16 |

By knowing the relationships between IIN and PAN length (by storing this information in a look-up table in the system memory 326, for example), it is possible to determine the number of DTMF tones that a caller will be expected to generate after the IIN has been detected and decoded. For instance, as soon as the means 326 for detecting and decoding has detected and decoded DTMF tones representing numerals 5-0-1-9, for example, the system knows to expect the caller to generate a total of 16 DTMF tones.

This variability in the particulars of card details has implications for when the system switches from the first mode to the second mode; and for when the system reverts to the first mode. This depends on a number of constraints.

A first constraint pertains to the IIN. In order for a call centre to be certain it has received a full IIN, the system must be configured to operate in the first mode until at least six DTMF tones have been received (corresponding to the maximum length of an IIN across all issuing networks). However, for any given PAN, it is possible to discern which of the issuing networks in the table above is correct after based on just the first four digits (and also to discern between most based on just the first two digits). Accordingly, in certain embodiments the system could be configured to operate in the first mode until the first two or the first four DTMF tones have been received.

A second constraint pertains to the PAN length. In certain embodiments, it may be desirable to maintain two-way communication between the caller 304 and the agent 310 as the caller 304 begins to enter the digits of the PAN and as the caller 304 approaches the end of PAN entry, as this is when interaction between the caller 304 and the agent 310 is most helpful. Thus, a particularly preferred implementation is for the system to operate in the first mode until the first six DTMF tones have been received, and while the final four DTMF tones are being received. In such an embodiment, it will be appreciated that the system 300 will operate in the second mode during entry of a different number of tones (depending on PAN length). For example, with a card of length 12, the system 300 will operate in the second mode during receipt of 2 tones (i.e. first mode for tones 1 to 6; second mode for tones 7 and 8; first mode for tones 9 to 12). With a card of length 16, the system 300 will operate in the second mode during receipt of 6 tones (i.e. first mode for tones 1 to 6; second mode for tones 7 to 12; first mode for tones 13 to 16). With a card of length 19, the system 300 will operate in the second mode during receipt of 9 tones (i.e. first mode for tones 1 to 6; second mode for tones 7 to 15; first mode for tones 16 to 19).

In the above-described embodiment, the system 300 must be configured so that the means 324 for detecting and decoding the data signals detects and decodes the IIN (e.g. the first six DTMF tones), and based upon the IIN determines the length of the PAN using a look-up table. Based upon the length of the PAN, the system 300 may calculate for how many tones it must operate in the second mode before reverting to the first mode in time for the system 300 to operate in the first mode for 4 tones.

However, in the above-described embodiment, it will be appreciated that the level of security (as measured by the number of DTMF tones throughout receipt of which the telephone signals are attenuated or blocked) will be different for cards of different PAN lengths. Instead, it may be preferred to attenuate or block the telephone signals during receipt of a fixed number of DTMF tones. A preferred level of security is achieved when telephone signals are attenuated or blocked during receipt of six DTMF tones. Thus, a particularly preferred implementation is for the system 300 to operate in the first mode until the first six DTMF tones have been received (for reasons given previously), and to operate in the second mode until the next six DTMF have been received. In such an embodiment, it will be appreciated that the system 300 will revert to operating the first mode for different number of tones (depending on PAN length). For example, with a card of length 12, the system 300 will not revert to operating in the first mode (i.e. first mode for tones 1 to 6; second mode for tones 7 to 12). With a card of length 16, the system 300 will revert to operating in the first mode for receipt of 4 tones (i.e. first mode for tones 1 to 6; second mode for tones 7 to 12; first mode for tones 13 to 16). With a card of length 19, the system 300 will revert to operate in the first for receipt of 7 tones (i.e. first mode for tones 1 to 6; second mode for tones 7 to 12; first mode for tones 13 to 19).

Alternatively the system 300 may switch between modes based on time. For instance, the system 300 could be configured to operate in the first mode for a first predetermined period of time before switching to operate in the second mode for a second predetermined period of time. Optionally, the system 300 may immediately thereafter revert to operating in the first mode for a third predetermined period of time. The predetermined periods of time may be set according to the average time taken for a caller to enter a certain number of digits.

It will be appreciated that the embodiments described above are mere examples of implementations. In particular, the values given in respect of the number of tones are merely exemplary, and may be any suitable predetermined number of tones. The ways in which the number of are determined may vary depending on the preferred implementation.

Figure 6:
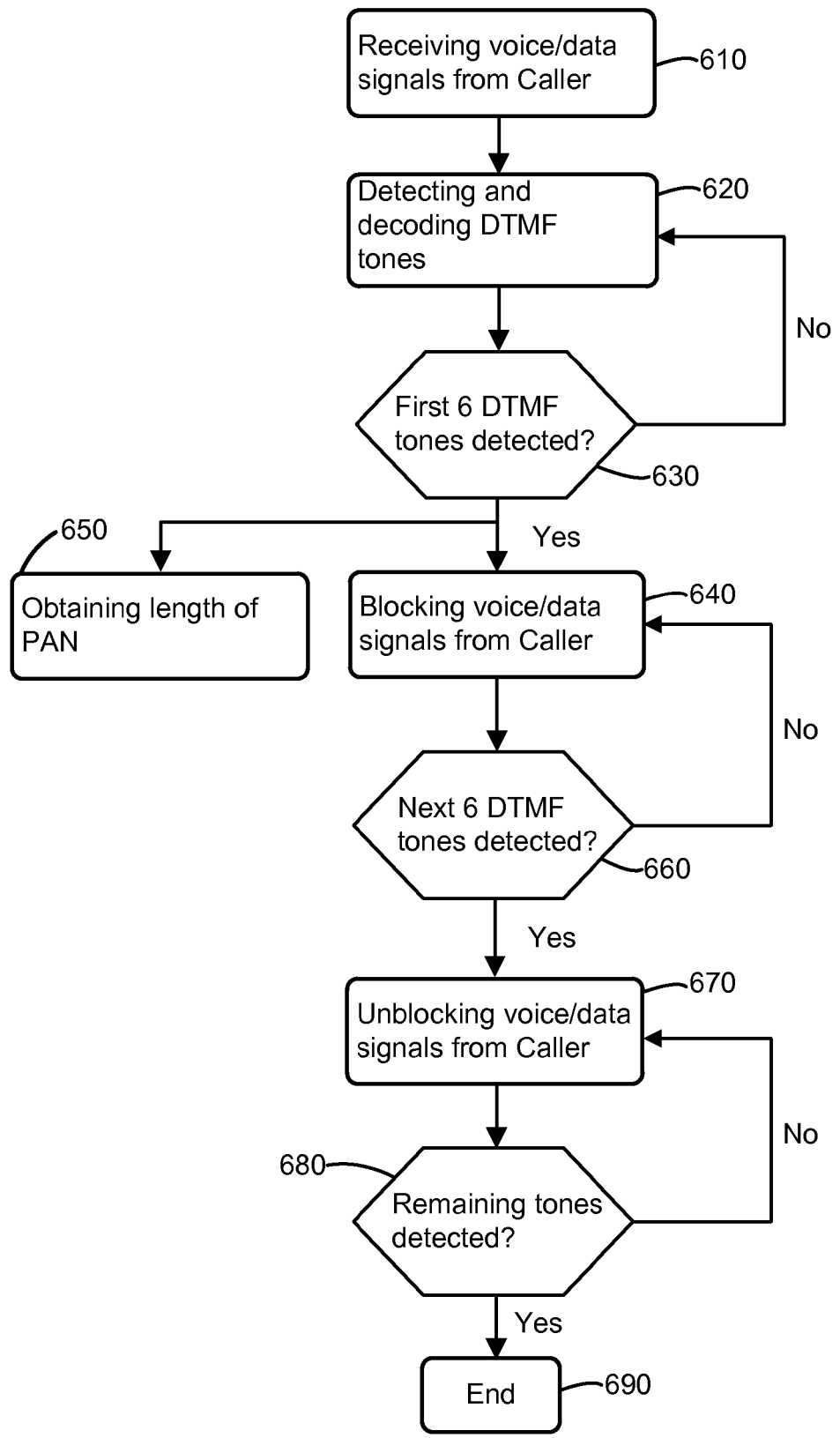
FIG. 6 illustrates a method of processing telephone calls according to one embodiment of the present disclosure.

FIG. 6 illustrates one embodiment of a method of processing telephone calls commensurate with the system 300 described in connection with FIG. 5. In step 610, the system 300 receives voice and data signals from a caller (e.g., caller 302). The voice and data signals are received at a first telephone interface (e.g., first telephone interface 301). In step 620, DTMF tones in the data signals are detected and decoded. The tones may be decoded in real time as they are received or stored temporarily in a memory (e.g. memory 326) and decoded in a batch. In any case, in step 630 a determination is made as to whether six DTMF tones have been detected. If not, the process returns to step 620. If so, the process moves on to step 640.

Optionally, the method may include the step of determining the length of the PAN based on the decoded digits corresponding to the IIN. Once the tones representing the IIN have been detected and decoded, they may be compared to a look-up table to find the corresponding length of the PAN.

Until this point, the voice and data signals received from the caller have been passed to an agent (e.g., agent 310). In step 640, the system 300 begins to attenuate (preferably block) the voice and data signals received from the caller such that the agent is impeded (preferably prevented) from receiving them. Nevertheless, the DTMF tones in the data signals continue to be detected and decoded. In step 660 a determination is made as to whether a further six DTMF tones have been detected. If not, the process returns to step 640. If so, the process moves on to step 670.

At this point, the system 300 ceases to attenuate (block) the voice and data signals received from the caller such that the agent can again receive them. The DTMF tones in the data signals continue to be detected and decoded. In step 680 a determination is made as to whether all remaining DTMF tones have been detected. If not, the process returns to step 670. If so, the process ends.

The present disclosure has been described with reference to particular embodiments; specifically in the context of receiving a PAN using DTMF tones. However, the present disclosure is not limited to those embodiments and finds utility in other contexts. The present disclosure is defined by the appended claims.

What is claimed is:

1. A telephone call processing system for processing telephone calls comprising voice signals and data signals between a caller and an agent, the system comprising:
   a first interface for receiving voice signals and data signals from the caller and a second interface for receiving voice signals and data signals from the agent, the first and second interfaces configured to selectively pass voice signals and data signals therebetween to enable communication between the caller and agent;
   attenuation means configured to selectively attenuate voice signals and data signals passing from the first interface to the second interface to selectively impede the agent from receiving the voice signals and data signals from the caller;
   detection means configured to detect and decode data signals received at the first interface; and
   a processor coupled to the attenuation means and detection means and configured to cause the detection means to begin detecting and decoding a string of discrete data signals from the caller, the string of discrete data signals having a length and conveying sensitive information, wherein while the string of discrete data signals is being received at the first interface, the system is configured to operate exclusively in each of:
    a first mode in which voice signals and data signals are permitted to pass from the first interface to the second interface to enable the agent to receive the voice signals and data signals from the caller; and
    a second mode in which the processor causes the attenuation means to attenuate voice signals and data signals passing from the first interface to the second interface to impede the agent from receiving the voice signals and data signals from the caller,
wherein the processor is further configured to cause the system to switch from the first mode to the second mode and operate in the second mode immediately after operating in the first mode, and to revert from the second mode to the first mode immediately after operating in the second mode, and
wherein the processor is further configured to automatically switch from the first mode to the second mode responsive to detecting, by the detection means, a first pre-determined number of discrete data signals of the string of discrete data signals, wherein the first pre-determined number is at least two, and wherein the processor is further configured to automatically revert from the second mode to the first mode responsive to detecting, by the detection means, a second pre-determined number of discrete data signals of the string of discrete data signals.

2. The system of claim 1, wherein information represented by a subset of the string of discrete data signals is indicative of its length, and wherein the processor is further configured to determine the length once the subset has been detected and decoded by the detection means.

3. The system of claim 2, wherein the processor is further configured to automatically revert from the second mode to the first mode upon detection, by the detection means, of a number of discrete data signals of the string of discrete data signals equal to the determined length minus a third pre-determined number.

4. The system of claim 1, wherein the attenuation means is further configured to selectively block voice signals and data signals passing from the first interface to the second interface to prevent the agent from receiving the voice signals and data signals from the caller.

5. The system of claim 1, wherein the attenuation means is further configured to selectively attenuate voice signals and data signals passing from the second interface to the first interface to selectively impede the caller from receiving the voice signals and data signals from the agent, and wherein, in the second mode, the processor causes the attenuation means to attenuate voice signals and data signals passing from the second interface to the first interface.

6. The system of claim 5, wherein the attenuation means is further configured to selectively block voice signals and data signals passing from the second interface to the first interface to prevent the caller from receiving the voice signals and data signals from the agent.

7. The system of claim 1, wherein the processor is further configured to cause the detection means to begin detecting and decoding the string of discrete data signals, either:
    automatically, upon receipt of a first data signal in the string of data signals; or
    upon receipt of an instruction from the agent via an internet connection.

8. The system of claim 1, wherein the string of discrete data signals is a plurality of dual-tone multi-frequency (DTMF) audio tones and wherein the detection means is further configured to determine an alphanumeric digit associated with each DTMF audio tone.

9. The system of claim 8, wherein alphanumeric digits associated with the plurality of DTMF audio tones of the string of discrete data signals represent a whole or a part of a Primary Account Number (PAN) or card security code of a bank card.

10. The system of claim 1, wherein the processor is further configured to communicate the information from the detected and decoded string of discrete data signals to a third party for subsequent processing.

11. A method of processing telephone calls comprising voice signals and data signals between a caller and an agent, the method comprising:
    receiving, at a call processor, voice signals and data signals from the caller, the data signals including a string of discrete data signals having a length and conveying sensitive information;
    detecting and decoding the string of data signals received from the caller; and
    while receiving the string of discrete data signals, operating the call processor exclusively in each of:
        a first mode in which the voice signals and data signals received from the caller are passed to the agent; and
        a second mode in which the voice signals and data signals received from the caller are attenuated to impede the agent from receiving them;
    wherein operating the call processor comprises:
        (a) operating the call processor in the first mode;
        (b) automatically switching the call processor from the first mode to the second mode and operating the call processor in the second mode immediately after operating in the first mode; and
        (c) automatically reverting the call processor from the second mode to the first mode immediately after operating in the second mode;
    wherein automatically switching the call processor from the first mode to the second mode is triggered responsive to detecting a first pre-determined number of discrete data signals of the string of discrete data signals, wherein the first pre-determined number is at least two, and wherein automatically reverting the call processor from the second mode to the first mode is triggered responsive to detecting a second pre-determined number of discrete data signals of the string of discrete data signals.

12. The method of claim 11, wherein detecting and decoding the string of data signals comprises detecting and decoding a subset of the string, the method further comprising determining the length of the string of discrete data signals based on information represented by the subset.

13. The method of claim 12, wherein automatically reverting the call processor from the second mode to the first mode is triggered responsive to detecting a number of discrete data signals of the string equal to the determined length of the string minus a third pre-determined number.

14. The method of claim 11, wherein selectively attenuating the voice signals and data signals received from the caller comprises selectively blocking the voice signals and data signals to prevent the agent from receiving them.

15. The method of claim 11, wherein operating the call processor in the second mode further comprises attenuating the voice signals and data signals received from the agent to impede the caller from receiving them.

16. The method of claim 11, wherein selectively attenuating the voice signals and data signals received from the agent comprises selectively blocking the voice signals and data signals to prevent the caller from receiving them.

17. The method of claim 11, wherein detecting and decoding the string of data signals received from the caller is triggered either:
   automatically, upon receipt of a first data signal of the string of data signals; or
   upon receipt of an instruction from the agent via an internet connection.

18. The method of claim 11, wherein the string of discrete data signals is a plurality of dual-tone multi-frequency (DTMF) audio tones and wherein the method further comprises determining an alphanumeric digit associated with each DTMF audio tone.

19. The method of claim 18, wherein the alphanumeric digits associated with the plurality of DTMF audio tones of the string of discrete data signals represent the whole or part of a Primary Account Number (PAN) or card security code of a bank card.

20. The method of claim 11, further comprising communicating the information from the detected and decoded string of discrete data signals to a third party for subsequent processing.

21. A telephone call processing system for processing telephone calls comprising voice signals and data signals between a caller and an agent, the system comprising:
   a first interface for receiving voice signals and data signals from the caller and a second interface for receiving voice signals and data signals from the agent, the first and second interfaces configured to selectively pass voice signals and data signals therebetween to enable communication between the caller and agent;
   attenuation means configured to selectively attenuate voice signals and data signals passing from the first interface to the second interface to selectively impede the agent from receiving the voice signals and data signals from the caller;
   detection means configured to detect and decode data signals received at the first interface; and
   a processor coupled to the attenuation means and detection means and configured to cause the detection means to begin detecting and decoding a string of discrete data signals from the caller, the string of discrete data signals having a length and conveying sensitive information,
   wherein while the string of discrete data signals is being received at the first interface, the telephone call processing system is configured to operate exclusively in each of:
      a first mode in which voice signals and data signals are permitted to pass from the first interface to the second interface to enable the agent to receive the voice signals and data signals from the caller; and
      a second mode in which the processor causes the attenuation means to automatically attenuate voice signals and data signals passing from the first interface to the second interface to impede the agent from receiving the voice signals and data signals from the caller,
   wherein information represented by a subset of the string of discrete data signals is indicative of its length, and wherein the processor is further configured to determine the length once the subset has been detected and decoded by the detection means, and
   wherein the processor is further configured to automatically revert from the second mode to the first mode upon detection, by the detection means, of a number of discrete data signals of the string of discrete data signals equal to the determined length of the string of discrete data signals minus a pre-determined number.

22. A method of processing telephone calls comprising voice signals and data signals between a caller and an agent, the method comprising:
   receiving, at a call processor, voice signals and data signals from the caller, the data signals including a string of discrete data signals having a length and conveying sensitive information;
   detecting and decoding the string of data signals received from the caller, wherein detecting and decoding the string of data signals comprises detecting and decoding a subset of the string;
   determining the length of the string of discrete data signals based on information represented by the subset;
   while receiving the string of discrete data signals, operating the call processor exclusively in each of:
      a first mode in which the voice signals and data signals received from the caller are passed to the agent; and
      a second mode in which the voice signals and data signals received from the caller are automatically attenuated to impede the agent from receiving them; and
   automatically reverting the call processor from the second mode to the first mode responsive to detecting a number of discrete data signals of the string of discrete data signals equal to the determined length of the string of discrete data signals minus a pre-determined number.

\* \* \* \* \*